Oct. 22, 1935. J. G. HARTLEY 2,018,259
APPARATUS FOR HEATING RAILS
Filed May 17, 1934 3 Sheets-Sheet 1
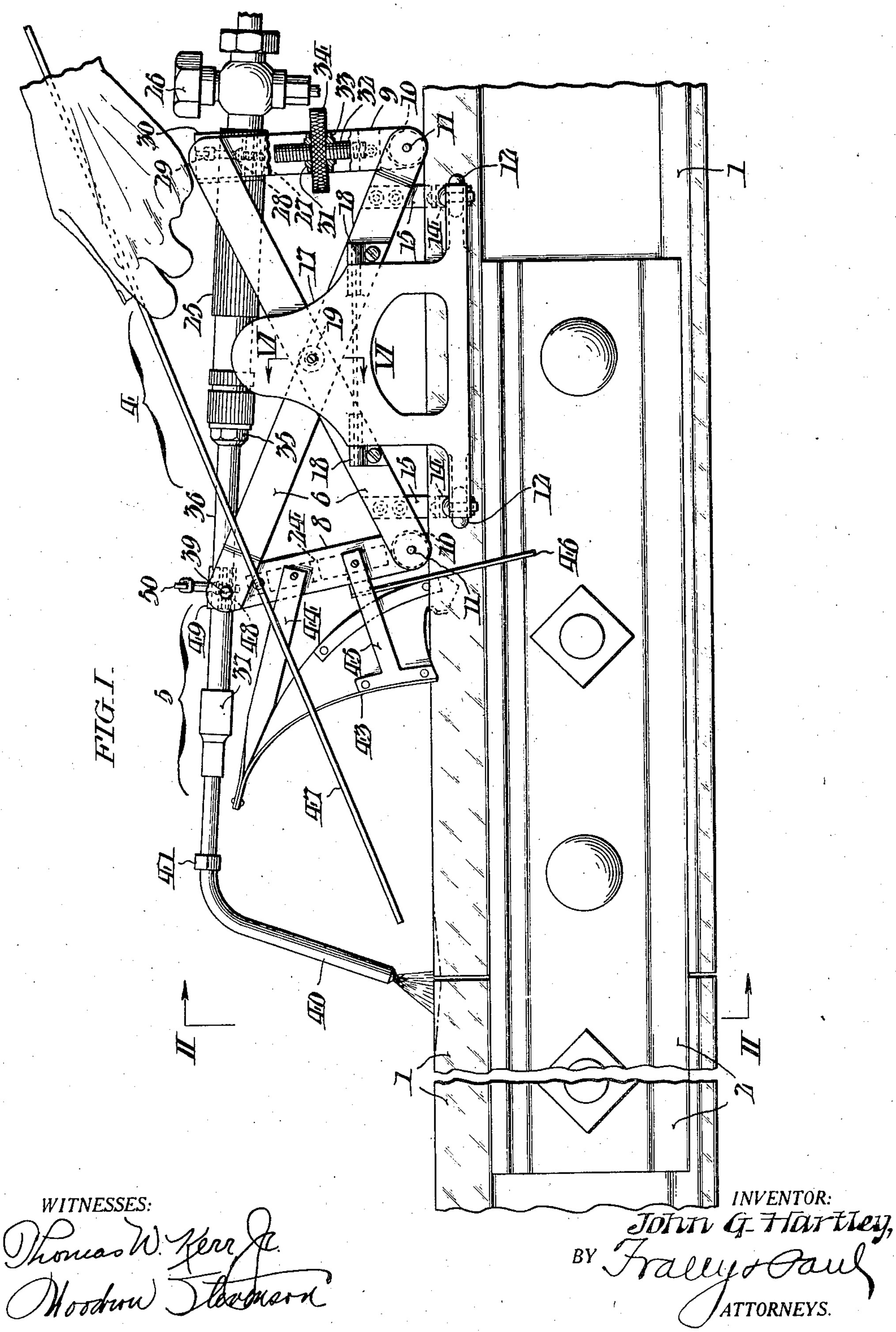
FIG. I.
WITNESSES:
Thomas W. Kerr Jr.
Woodrow Stevenson
INVENTOR:
John G. Hartley,
BY Fraley & Paul
ATTORNEYS.

Oct. 22, 1935. J. G. HARTLEY 2,018,259
APPARATUS FOR HEATING RAILS
Filed May 17, 1934 3 Sheets-Sheet 2
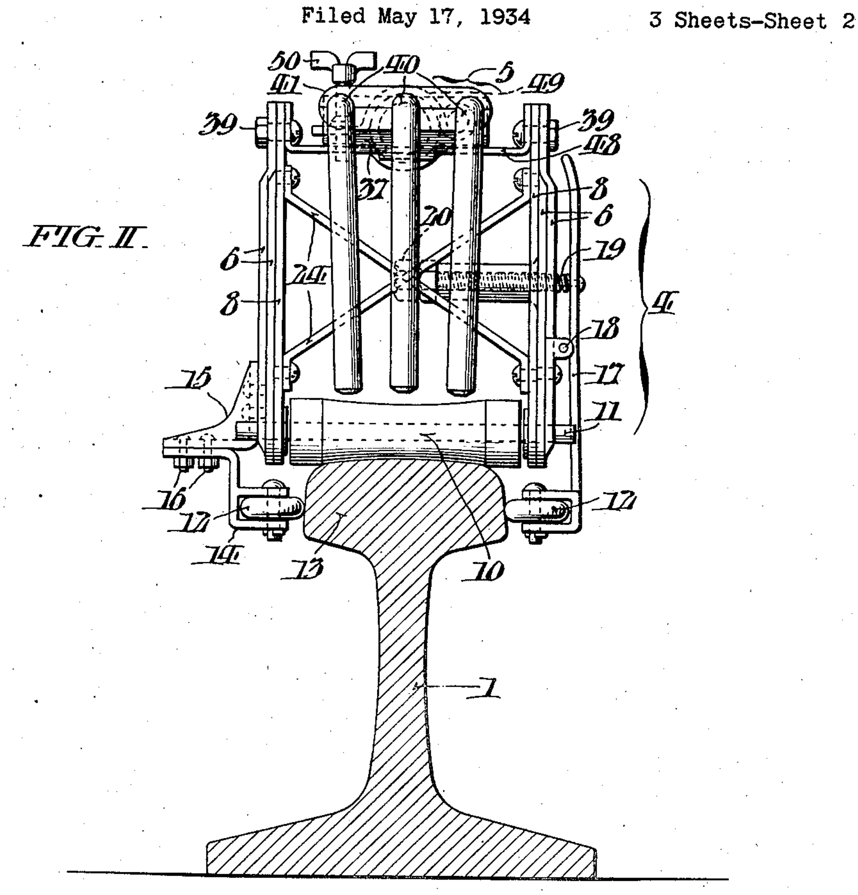
FIG. II.
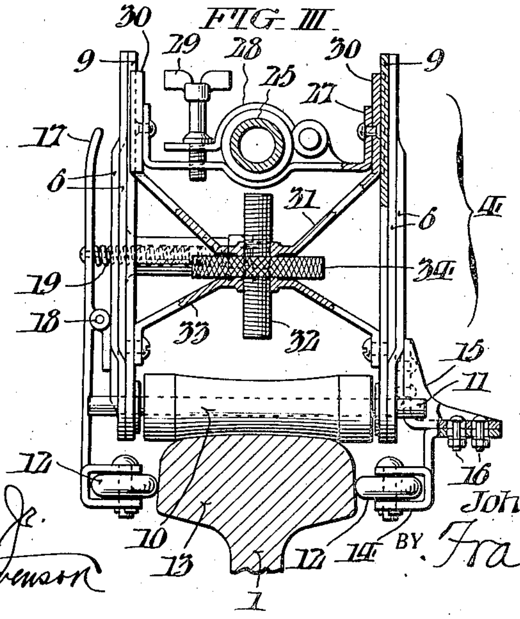
FIG. III.
WITNESSES:
Thomas W. Kerr, Jr.
Woodrow Stevenson
INVENTOR:
John G. Hartley,
BY Fraley & Paul
ATTORNEYS.

Oct. 22, 1935. J. G. HARTLEY 2,018,259
APPARATUS FOR HEATING RAILS
Filed May 17, 1934 3 Sheets-Sheet 3
FIG. IV.
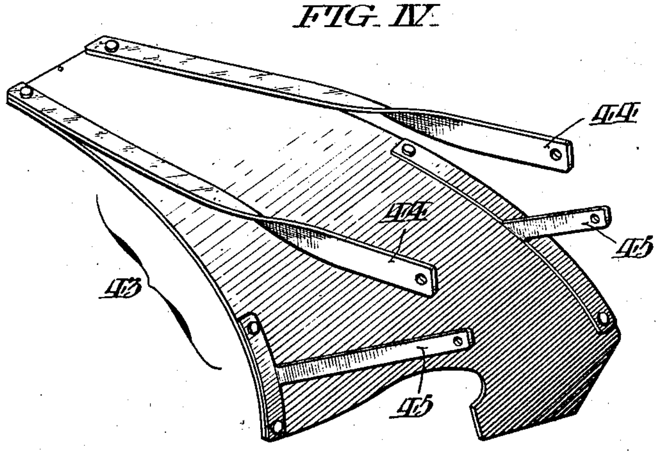
FIG. V.
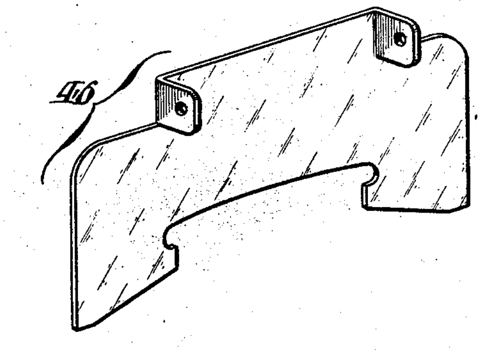
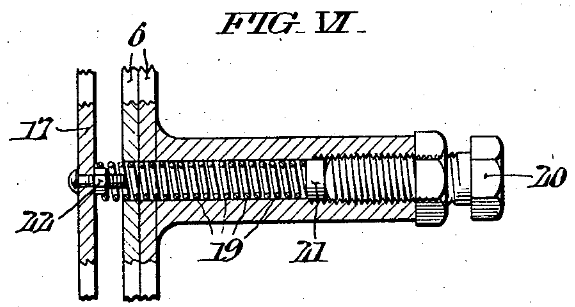
FIG. VI.
WITNESSES:
Thomas W. Kerr, Jr.
Woodrow Stevenson
INVENTOR:
John G. Hartley,
BY Frailey & Paul
ATTORNEYS.

Patented Oct. 22, 1935

2,018,259

UNITED STATES PATENT OFFICE 2,018,259

APPARATUS FOR HEATING RAILS

John G. Hartley, Wayne, Pa.

Application May 17, 1934, Serial No. 726,190

8 Claims. (Cl. 263—9)

This invention relates to apparatus for heating rails, and while applicable to heat treatment generally, is especially useful for the purpose of building up battered rail ends.

In my co-pending patent application, Serial No. 726,189 filed May 17, 1934, I have described an invention in a method of building up battered rail ends, and have made reference to certain difficulties involved in the customary method of welding new metal to rail heads, in which a single flame oxyacetelene torch is used, as well as to the advantages to be gained by using a multiple flame torch having its discharge tips arranged transversely of the rail head in such manner as to insure uniform heating of the rail head throughout the width thereof.

One object of the present invention is to provide a multiple flame heating torch satisfying the requirements desired for the purpose of welding battered rail heads in accordance with the method of the co-pending application referred to above.

A further object of the invention is to provide means for supporting and guiding a heating torch on a rail in such manner as to relieve the operator of the weight of the torch and permit him to operate the same more efficiently.

A further object of the invention is to provide, in such apparatus, means for adjustably fixing the position of the torch in both vertical and horizontal planes so as to maintain the discharge tips at the desired constant distance above the rail head and in positions centered with respect to the longitudinal center line of the rail.

Other more specific objects and advantages characterizing my invention will become apparent from the description hereinafter set forth of one example or embodiment of the same, having reference to the accompanying drawings, whereof:

Fig. I represents a side elevation of a rail joint with apparatus of my invention applied thereto.

Fig. II represents a front elevation of the same, as viewed from the left-hand end of Fig. I and indicated by the arrows II—II.

Fig. III represents a rear elevation of the same.

Fig. IV represents a perspective view of the shield of the above apparatus which is used for the protection of the operator.

Fig. V represents a perspective view of the extension member associated with said shield; and, Fig. VI represents an enlarged cross section of the carriage, taken as indicated by the lines VI—VI of Fig. V.

In the drawings there is illustrated a rail joint comprising rail ends 1 joined together by a joint bar 2 in a conventional manner. Mounted on one of the rails there is shown apparatus of my invention comprising generally a roller carriage 4 carrying a welding torch comprehensively designated at 5. In the illustrated example the carriage 4 is made up of a framework of diagonal side bars 6, front bars 8 and rear bars 9. At the front and rear end of the framework along the bottom thereof, rollers 10 are provided for engagement with the tread surfaces of the rail, these rollers being supported by pins 11 disposed at the points of intersection of the side bars 6 with the bottom ends of the front bars 8 and rear bars 9. Preferably the rollers 10 are centrally concaved to conform substantially with the arcuate contour of the tread surface of the rail.

Additional rollers 12 are supported on the carriage 4 in such manner as to bear against the sides of the rail head 13. The rollers 12 at one side of the rail are mounted on stirrups 14 which are in turn adjustably secured to angle brackets 15 by means of bolts 16. At the other side of the rail the rollers 12 are mounted on a plate 17 which is pivoted to the side bars 6 by hinges 18. Preferably at the point of intersection of the side bars 6, a spring 19 is provided for the purpose of urging the upper end of the hinged plate 17 outwardly, and hence urging the rollers 12 carried at the lower end inwardly toward the side of the rail head 13. For the purpose of adjusting the tension on the spring 19, I desirably employ an adjusting screw 20 which operates on the inner end of the spring 19 as shown most clearly in Fig. VI. The adjusting screw 20 is externally threaded and bears against a plug 21 which in turn bears against the inner end of the spring 19. The outer end of the spring 19 is restrained against shifting by means of a nut 22. The adjustment of the tension on the spring 19 is obtained by turning the adjusting screw 20 in one direction or the other. It is desirable that the spring 19 be under sufficient tension to urge the hinged plate 17 with its rollers 12 against the rail with such pressure as to maintain the carriage 4 against lateral shifting. Moreover, it will be observed that by means of the adjustable stirrups 14 at the opposite sides of the rail, it is possible to adapt the carriage for use on rails of different sizes and to insure centering of the carriage with respect to the longitudinal center line of the rail. The forward end of the carriage is braced by crossing bars 24, shown clearly in Figs. I and II, which serve to rigidify the framework.

The torch 5 is shown pivotally mounted on the front of the carriage 4 with its discharge end extending forwardly and downwardly toward the rail. The rear end of the torch 5 is in the form of a barrel 25 equipped with a connection 26 including valves controlling the supply of gas and oxygen from flexible hoses which are not shown in the drawings.

To maintain the barrel 25 in a fixed position within the carriage 4, and hence to maintain the discharge end of the torch at a fixed vertical distance above the rail, I preferably employ at the rear of the carriage 4 a holder 27 having a hinged clip 28 for engaging [illegible]

battered rail ends. When used for welding, as explained in my co-pending application referred to above, the operator may conveniently employ a welding rod in the form of a flat ribbon, as indicated at 47 in Fig. I, applied to the rail from one side of the shield 43. In its preferred form the ribbon form welding rod 47 is of uniform thickness throughout and of a sufficient width to cover the width of the tread surface of the rail incident to its deposition thereon.

In building up a battered rail end, using the apparatus of this invention, the operator, after adjusting the carriage 4 and torch 5 to obtain the best results in accordance with previous experience, and having clamped the torch in a fixed [illegible]

multiple frame torch, and means for supporting and guiding said torch on a rail, the tips of said torch being maintained transversely of the rail head at a fixed distance therefrom with their axes corresponding to extended radii of the circle of which the rail head curve is a segment.

2. Apparatus for heating rails comprising a multiple flame torch, and means for supporting and guiding said torch on a rail, the tips of said torch being maintained transversely of the rail head in such manner that the flame of each tip overlaps the flame of the adjacent tip at a point sufficiently above the tread surface to provide the maximum heat, and the flames of said tips collectively cover the width of the tread surface, said tips conforming in their longitudinal axes to extended radii of the circle of which the rail head curve is a segment.

3. Apparatus for heating rails comprising a multiple flame torch, a carriage adapted for movement along a rail and serving to support said torch, with the tips thereof arranged transversely of the rail head, and equidistant therefrom, the longitudinal axes of said tips conforming to extended radii of the circle of which the rail head curve is a segment, and means on said carriage for effecting simultaneous adjustment of the vertical position of said tips with respect to the rail head.

4. Apparatus for heating rails comprising a carriage adapted for movement along a rail, a torch disposed longitudinally of the carriage and pivotally mounted near the front end thereof, said torch having tips arranged transversely of the rail head and equidistant therefrom, the longitudinal axes of said tips conforming to extended radii of the circle of which the rail head curve is a segment, the discharge end of said torch extending forwardly and downwardly toward the rail, and means for adjustably fixing the rear end of said torch on said carriage thereby to control the vertical distance of the discharge end of the torch above the rail.

5. Apparatus for heating rails comprising a carriage adapted for movement along a rail, and a torch mounted on said carriage, said carriage having rollers adapted to engage the tread surface of the rail and having additional rollers for engaging opposite sides of the rail head, the latter rollers being adjustably mounted on the carriage to accommodate rails of varying width.

6. Apparatus for heating rails comprising a carriage adapted for movement along a rail, a torch mounted on said carriage, said carriage having rollers adapted to engage the tread surface of the rail and having additional rollers for engaging opposite sides of the rail head, means including a spring for urging said latter rollers towards each other, and means for adjusting the tension of said spring.

7. Apparatus for heating rails comprising a carriage adapted for movement along a rail, a torch mounted on said carriage and having a plurality of discharge tips arranged transversely of the rail, and means for centering said carriage with respect to the rail comprising rollers adjustably mounted on the carriage and adapted to engage the sides of the rail head.

8. Apparatus for heating rails comprising a carriage adapted for movement along a rail, a torch mounted on said carriage and having a plurality of discharge tips arranged transversely of the rail, means on said carriage for adjustably fixing the position of said discharge tips in a vertical plane above the rail, and additional means on said carriage for adjustably centering said tips in a horizontal plane above the rail.

JOHN G. HARTLEY.